US012606974B2

(12) United States Patent
Kim et al.

(10) Patent No.: US 12,606,974 B2
(45) Date of Patent: Apr. 21, 2026

(54) SUPPORT STRUCTURE FOR OFFSHORE WIND POWER GENERATOR AND METHOD OF INSTALLING THE SAME

(71) Applicant: Industry-Academic Cooperation Foundation, Kunsan National University, Gunsan-si (KR)

(72) Inventors: Dong Hyawn Kim, Sejong (KR); Jang Ho Lee, Gunsan-si (KR)

(73) Assignee: Industry-Academic Cooperation Foundation, Kunsan National University, Gunsan-si (KR)

( * ) Notice: Subject to any disclaimer, the term of this patent is extended or adjusted under 35 U.S.C. 154(b) by 167 days.

(21) Appl. No.: 18/485,396

(22) Filed: Oct. 12, 2023

(65) Prior Publication Data

US 2025/0122688 A1     Apr. 17, 2025

(51) Int. Cl.
| | |
|---|---|
| *E02D 27/42* | (2006.01) |
| *E02D 7/18* | (2006.01) |
| *E02D 7/20* | (2006.01) |
| *E02D 7/24* | (2006.01) |
| *E02D 7/26* | (2006.01) |
| *E02D 27/52* | (2006.01) |
| *F03D 13/25* | (2016.01) |

(52) U.S. Cl.
CPC ............. *E02D 27/425* (2013.01); *E02D 7/18* (2013.01); *E02D 7/20* (2013.01); *E02D 7/24* (2013.01); *E02D 7/26* (2013.01); *E02D*

*27/525* (2013.01); *F03D 13/25* (2016.05); *E02D 2250/0053* (2013.01); *E02D 2250/0061* (2013.01); *E02D 2600/20* (2013.01)

(58) Field of Classification Search
CPC . F03D 13/25; E02D 2250/0053; E02D 27/42; E02D 27/425; E02D 27/52; E02D 27/525
See application file for complete search history.

(56) References Cited

FOREIGN PATENT DOCUMENTS

| | | | |
|---|---|---|---|
| CN | 104652502 | * | 5/2015 |
| CN | 111021392 | * | 4/2020 |
| KR | 10-2013-0037384 A | | 4/2013 |
| KR | 10-2016-0007698 A | | 1/2016 |
| KR | 2016136741 | * | 11/2016 |
| KR | 10-2018-0124456 A | | 11/2018 |
| KR | 10-2020-0043719 A | | 4/2020 |

(Continued)

*Primary Examiner* — Sean D Andrish
(74) *Attorney, Agent, or Firm* — You & IP, LLC

(57)     ABSTRACT

Disclosed is a support structure for an offshore wind power generator which is applicable to various seafloor terrains by increasing the number of seafloor penetration cylinders that are installed to be penetrated into and fixed to a seafloor ground and in which a vibration generation part and a seawater injection part assist the penetration of the seafloor penetration cylinders into the seafloor ground. The support structure for an offshore wind power generator includes: five seafloor penetration cylinders; covers provided above the five seafloor penetration cylinders, respectively; a drain part provided inside each of the covers; a seawater injection part provided in each of the five seafloor penetration cylinders to inject high-pressure seawater and align horizontal levels of the five seafloor penetration cylinders; and a supporting stand connected to the covers via connection parts.

2 Claims, 10 Drawing Sheets

(56)         References Cited

FOREIGN PATENT DOCUMENTS

| KR | 10-2020-0119110 A | | 10/2020 |
| KR | 10-2506542 B1 | | 3/2023 |
| WO | WO 2019070140 | * | 4/2019 |

* cited by examiner

Direction of propulsive force

Direction of propulsive force

Direction of propulsive force

Direction of propulsive force

600

610

620

630

SUPPORT STRUCTURE FOR OFFSHORE WIND POWER GENERATOR AND METHOD OF INSTALLING THE SAME

FIELD

The present disclosure relates to a support structure for an offshore wind power generator and a method of installing the same, and more specifically, a support structure for an offshore wind power generator which is applicable to various seafloor terrains by increasing the number of seafloor penetration cylinders that are installed to penetrate into and be fixed to a seafloor ground, and configured such that a vibration generation part and a seawater injection part provided in the seafloor penetration cylinder assist the penetration of the seafloor penetration cylinder into the seafloor ground.

BACKGROUND

In general, the wind power, which is one of renewable energies, may be classified into the land wind power and the offshore wind power according to an installation location. The offshore wind power is receiving a lot of attention around the world because it can secure more abundant wind than the land wind power, can be developed on a large scale, and is relatively free from matters such as noise or natural damage. The wind power generator using the offshore wind power utilizes a lower support structure based on the seafloor ground. The wind power generator is installed by analyzing various loads on the lower support structure and selecting an appropriate construction method according to the analyzed results. Types of such construction methods include a gravity-based foundation, a monopile foundation, a jacket foundation, and a suction foundation.

The method using the suction foundation has the advantages of low installation costs, no restrictions on water depth, and quick installation. Such a suction foundation-based method is a technology that penetrates the foundation into the ground using a difference between internal and external water pressures of a bucket cylinder by discharging seawater and air in the cylinder to the outside with a suction pump installed above the cylinder.

In the related art, in a case where a bucket cylinder penetrates into the seafloor ground and descends, when the bucket cylinder gets caught by obstacles, horizontal levels of a plurality of other cylinders connected to the bucket cylinder may not be aligned. This causes matters in installing and maintaining the offshore wind power generator.

In addition, in terrains where the seafloor ground is soft and the bed rock depth is shallow, the penetration depth and diameter of the bucket cylinder are limited, which makes the installation of the bucket cylinder difficult.

Therefore, there is a need for the development of a support structure for an offshore wind power generator in which the bucket cylinder may be installed even in various seafloor terrains and may be installed quickly in the course of penetrating the bucket cylinder into the seafloor ground.

DOCUMENT IN RELATED ART

Patent Document

Patent Document 1: Korean Patent Publication No. 10-2020-0043719 (Published on Apr. 28, 2020)

SUMMARY

The present disclosure is proposed to solve the aforementioned matters, and the present disclosure is for the purpose of providing a support structure for an offshore wind power generator which is capable of being firmly supported even in shallow seafloor terrains by increasing the number of installed seafloor penetration cylinders and accurately aligning horizontal levels of the seafloor penetration cylinders.

Further, the present disclosure is for the purpose of providing a support structure for an offshore wind power generator in which vibration and impact are applied to a seafloor penetration cylinder so that the seafloor penetration cylinder may quickly penetrate into a seafloor ground even when there are obstacles during the penetration.

The technical matters to be achieved in the present disclosure are not limited to the technical matters described above, and other technical matters not mentioned will be clearly understood by those skilled in the art from the following description.

According to an example embodiment, of the present disclosure, a support structure for an offshore wind power generator may include: a supporting stand configured to support the offshore wind power generator; five seafloor penetration cylinders having a hollow structure in which an upper end portion is closed and a lower end portion is open so that an interior is empty, wherein the five seafloor penetration cylinders are arranged at equal intervals on a circumference of a circle surrounding the supporting stand to form a regular pentagon; covers provided above the five seafloor penetration cylinders, respectively; a drain part provided inside each of the covers; and a connection part configured to connect each of the covers and the supporting stand.

In an example embodiment, the support structure for an offshore wind power generator may further include: a seawater injection part provided in each of the five seafloor penetration cylinders and configured to inject high-pressure seawater to a seafloor ground.

In an example embodiment, the drain part may include: a drain pump provided inside each of the covers; and a drain pipe connected to the drain pump and configured to connect the interior of each of the five seafloor penetration cylinders and an exterior of a main housing.

In an example embodiment, the seawater injection part may include: a high-pressure pump for seawater provided in each of the five seafloor penetration cylinders; and an injection nozzle connected to the high-pressure pump for seawater via a nozzle pipe and configured to inject seawater flowing into the nozzle pipe with an operation of the high-pressure pump for seawater.

In an example embodiment, the injection nozzle may include at least three or more injection nozzles fixedly provided on an inner wall of each of the five seafloor penetration cylinders in a vertical direction, and a discharge port of the injection nozzle may be provided toward an end of each of the five seafloor penetration cylinders.

In an example embodiment, the support structure for an offshore wind power generator may further include: a vibration generation part provided inside each of the covers and configured to apply impact vibration to each of the five seafloor penetration cylinders.

In an example embodiment, the vibration generation part may include: a motor; an operational member configured to perform a vertical linear motion by the motor; and a hitting part provided on a lower end of the operational member.

In an example embodiment, the connection part may include: a first connection part configured to connect an upper portion of each of the covers and the supporting stand; a second connection part configured to connect a lower portion of each of the covers and the supporting stand; and a third connection part configured to connect the covers to each other.

In an example embodiment, the support structure for an offshore wind power generator may further include: at least one or more ribs configured to connect the five seafloor penetration cylinders and the covers.

In an example embodiment, each of the at least one or more ribs may include: a support plate fixed to each of the five seafloor penetration cylinders and having a T-shape; and a reinforcement plate configured to reinforce the support plate.

According to another example embodiment of the present disclosure, a method of installing a foundation of an offshore wind power generator on a seafloor ground using a water difference between an interior and an exterior of each of seafloor penetration cylinders, may include: penetrating each of the seafloor penetration cylinders into the seafloor ground by its own weight; suctioning seawater and air in the interior of each of the seafloor penetration cylinders by operating a drain pump; penetrating each of the seafloor penetration cylinders into the seafloor ground by the suction of the drain pump; and fixing each of the seafloor penetration cylinders to the seafloor ground.

In an example embodiment, the method may further include: after the penetrating of each of the seafloor penetration cylinders into the seafloor ground by the suction of the drain pump, operating a vibration generation part to adjust a penetration speed of each of the seafloor penetration cylinders and to align horizontal levels of the seafloor penetration cylinders.

In an example embodiment, the method may further include: after the penetrating of each of the seafloor penetration cylinders into the seafloor ground by the suction of the drain pump, operating the vibration generation part and a seawater injection part in a simultaneous manner to inject high-pressure seawater to floors of the seafloor penetration cylinders, to adjust a penetration speed of each of the seafloor penetration cylinders and to align the horizontal levels of the seafloor penetration cylinders.

In an example embodiment, the drain pump, the vibration generation part, and the seawater injection part may be configured to be controlled in the simultaneous manner according to the penetration speed of each of the seafloor penetration cylinder.

As described above, according to an example embodiment of the present disclosure, by providing at least one or more seafloor penetration cylinders in a support structure, it is possible to firmly support an offshore wind power generator even in terrains where a seafloor ground is soft and a bed rock depth is shallow.

According to an example embodiment of the present disclosure, by increasing a penetration speed of the seafloor penetration cylinder into the seafloor ground with a vibration generation part and a seawater injection part, it is possible to quickly install the support structure for an offshore wind power generator.

According to an example embodiment of the present disclosure, by aligning horizontal levels of a plurality of other seafloor penetration cylinders with the vibration generation part and the seawater injection part, it is possible to stably install the offshore wind power generator.

The effects that may be obtained in the present disclosure are not limited to the aforementioned effects, and other effects not mentioned will be clearly understood by those skilled in the art from the following description.

DETAILED DESCRIPTION

Hereinafter, various preferred example embodiments of the present disclosure will be described in detail with reference to the accompanying drawings. Features and advantages of the present disclosure, and means for achieving them, will become more apparent by example embodiments described below in detail in conjunction with the accompanying drawings. However, example embodiments which will be described later are merely examples and the present disclosure is not limited thereto. Further, constituent elements in the example embodiments may be appropriately combined to each other as long as there is no other mention or they are not contradictory.

Further, when a part "comprise or includes" a constituent element through the specification, this means that it necessarily includes the respective constituent element regardless of other constituent elements, and does not mean to exclude the addition of other constituent elements.

Throughout the present specification, when a constituent element is referred to as being "connected" to another constituent element, the constituent element may be in direct contact with another constituent element, or may be "indirectly" or "electrically" connected to another constituent element by intervening yet another constituent element therebetween.

Further, throughout the present specification, the description that a layer (film), region, pattern, or structure is formed "on" or "above" a substrate, side (film), region, pad, or pattern should be understood to encompass that the layer (film), region, pattern, or structure is directly formed on (or above) the substrate, side (film), region, pad, or pattern, or by intervening another layer therebetween. The standards relating to "on/above or below/under each layer" will be described with reference to the drawings.

Further, terms "first," "second," and the like are used to distinguish a plurality of constituent elements from each other, and do not limit the order or other features of the constituent elements.

Figures 1A, 1B:
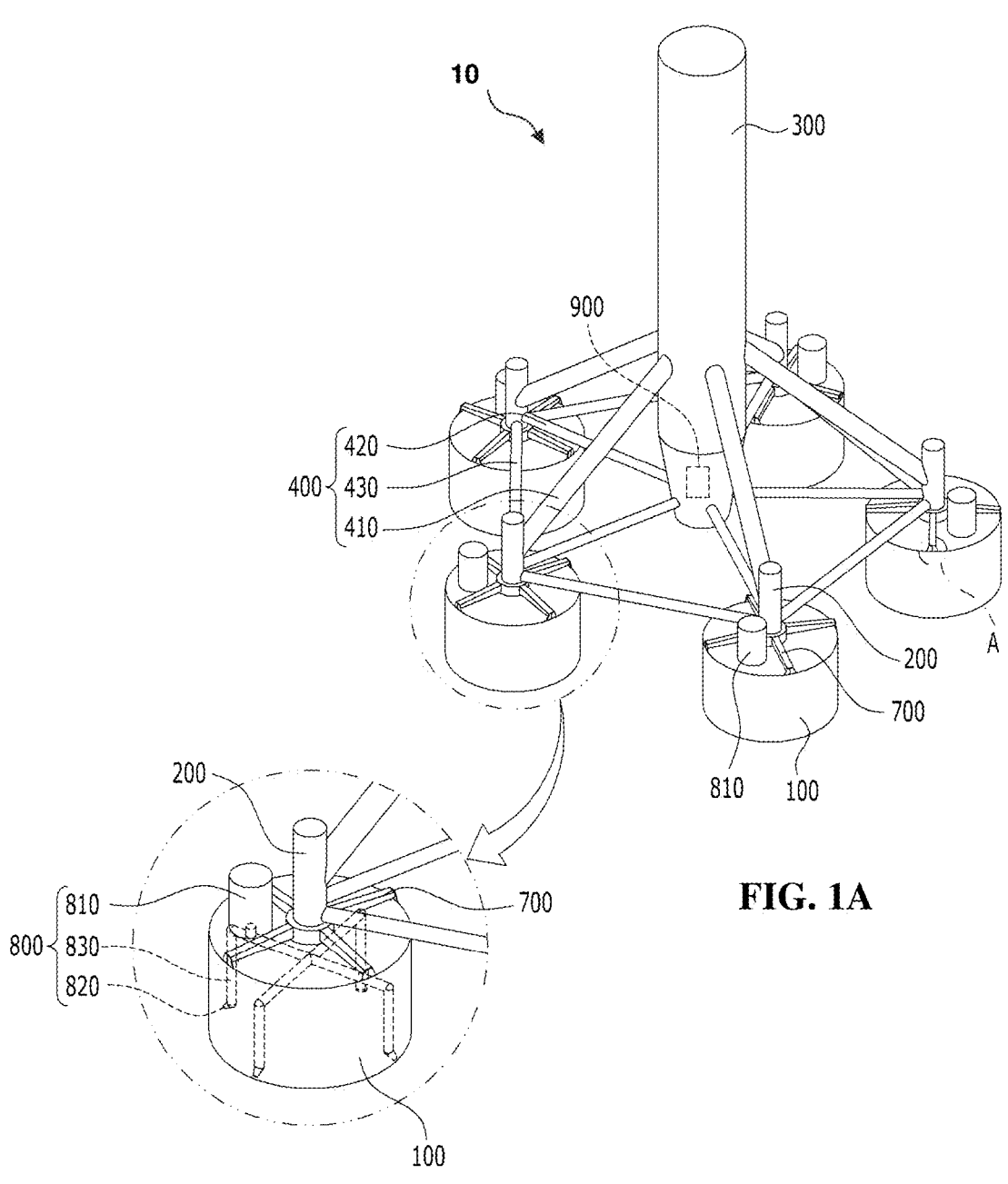
FIG. 1A is a perspective view schematically illustrating a support structure for an offshore wind power generator according to an example embodiment of the present disclosure.
FIG. 1B is an enlarged view of a seafloor penetration cylinder 100.
Figure 2:
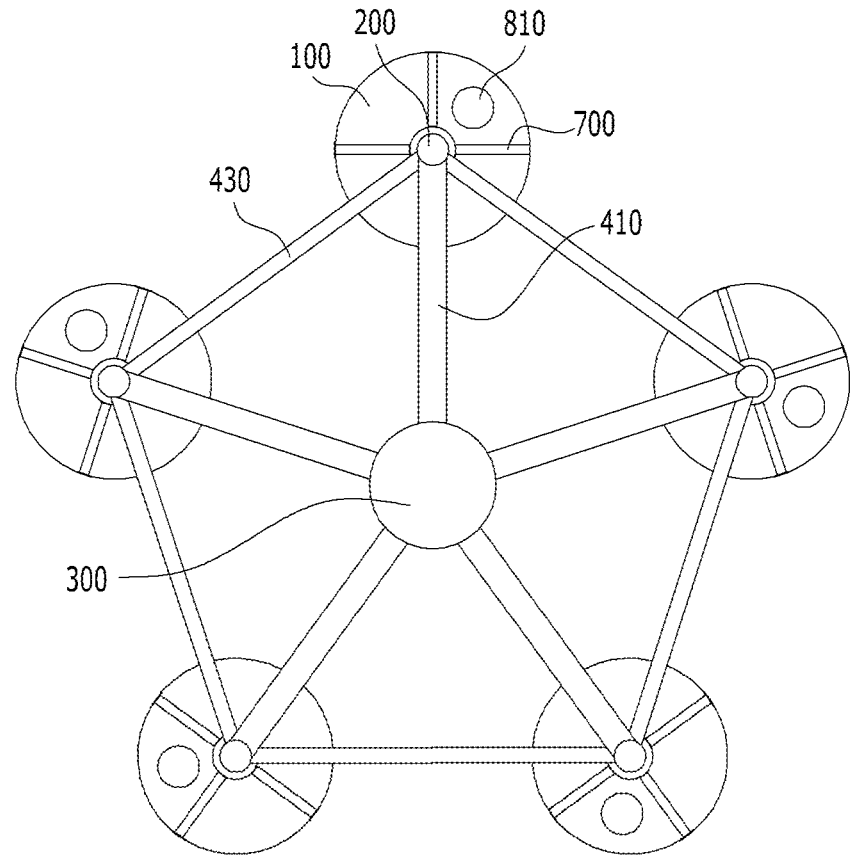
FIG. 2 is a plan view schematically illustrating the support structure for an offshore wind power generator according to an example embodiment of the present disclosure.
Figure 4:
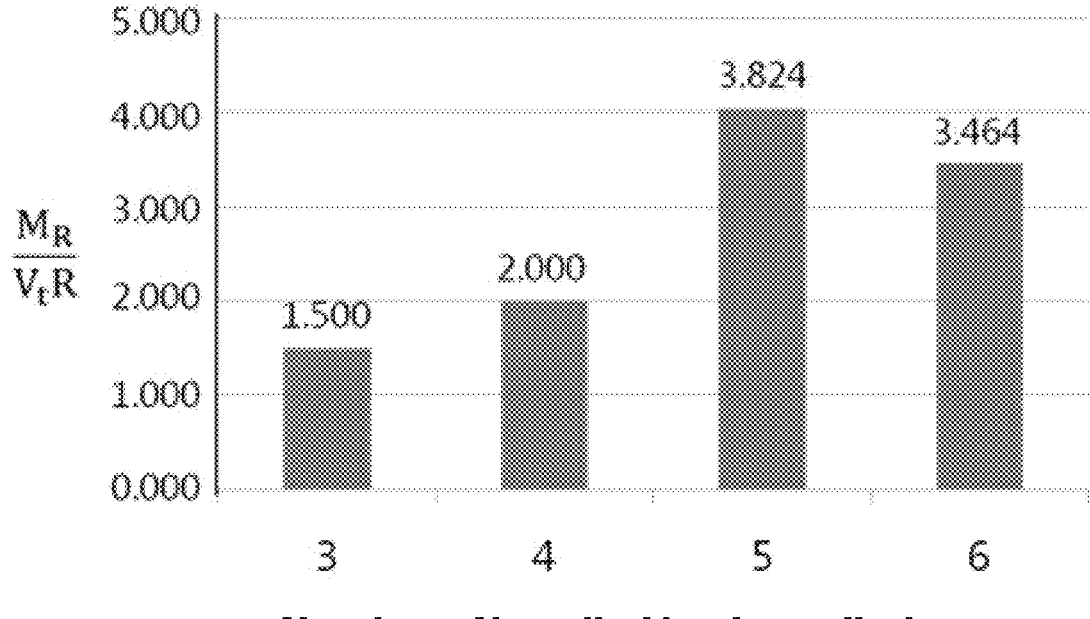
FIG. 4 is a graph illustrating a value of $M_R/V_TR$ as a function of the number of seafloor penetration cylinders provided in the support structure for an offshore wind power generator.
Figure 5:
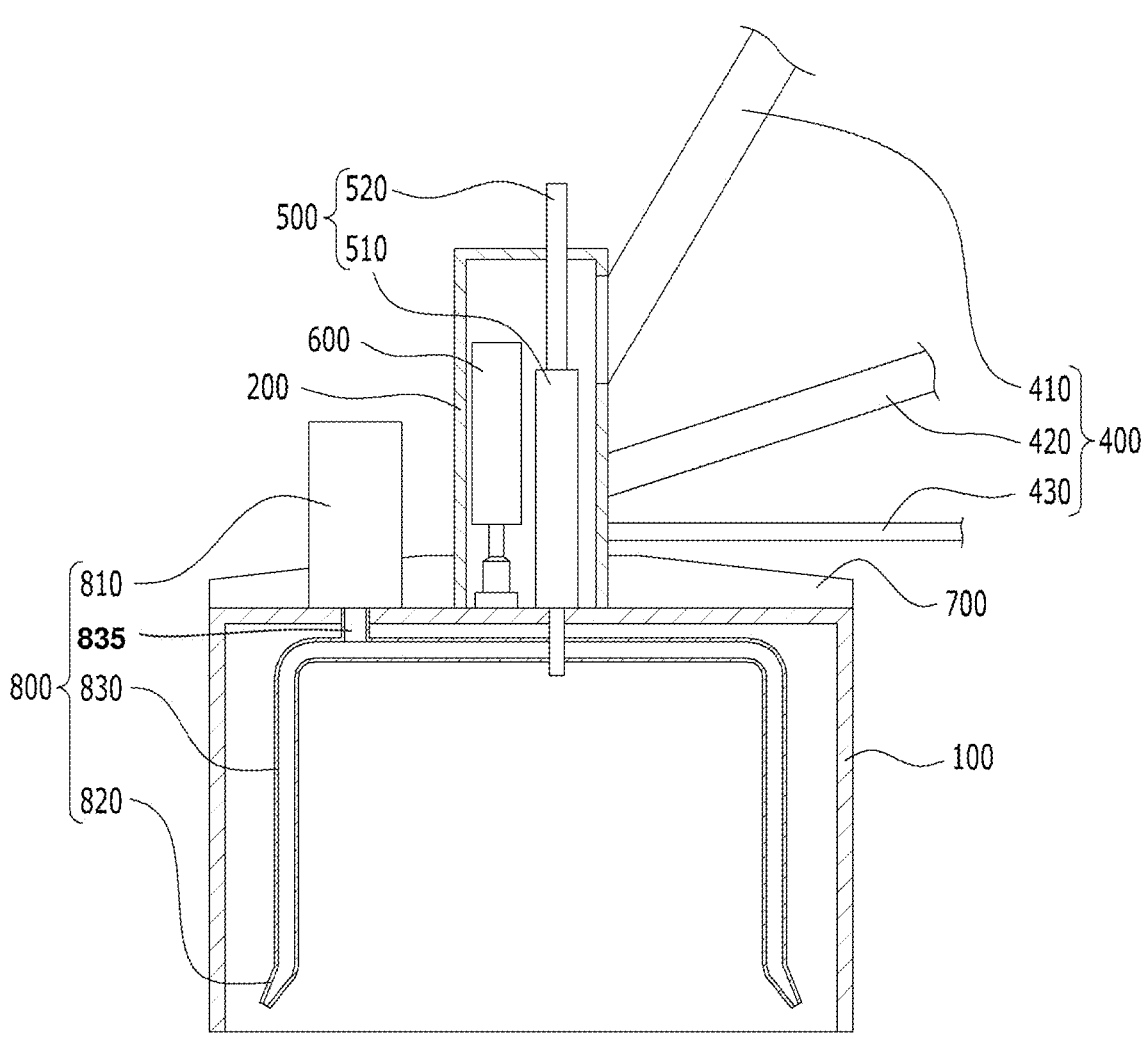
FIG. 5 is a cross-sectional view schematically illustrating the seafloor penetration cylinder, a drain pump, and a seawater injection part according to an example embodiment of the present disclosure.
Figure 6:
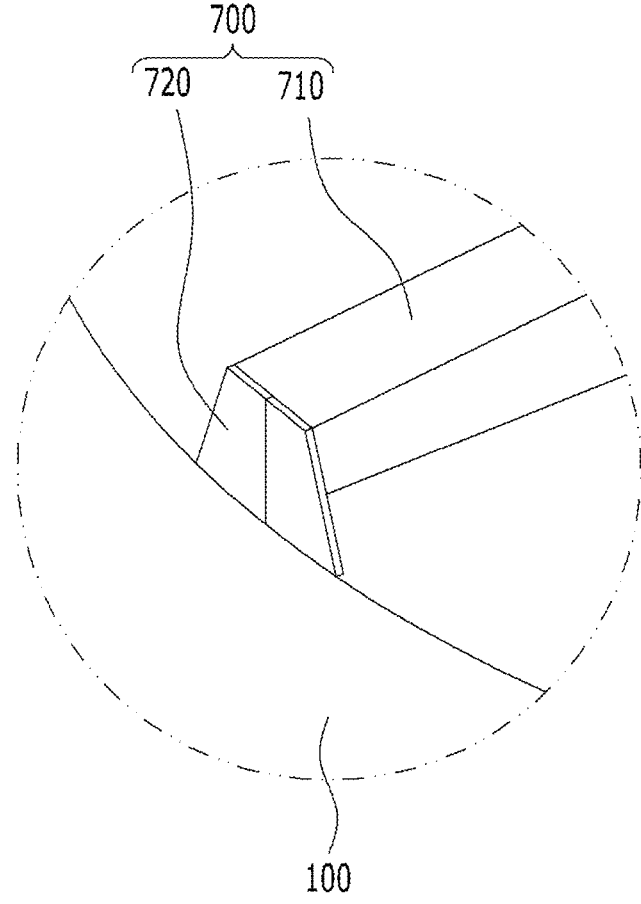
FIG. 6 is an enlarged view of a rib corresponding to an area A in the perspective view schematically illustrating the support structure for an offshore wind power generator illustrated in FIG. 1A.
Figure 7:
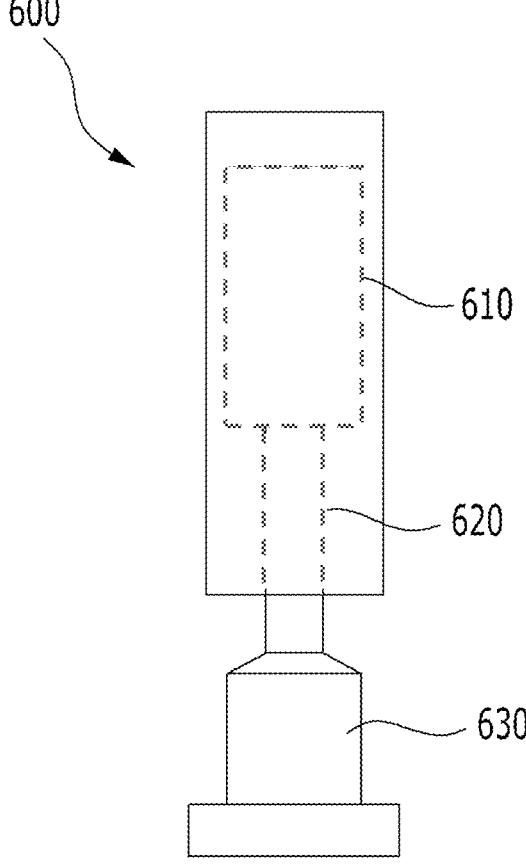
FIG. 7 is a view schematically illustrating a vibration generation part according to an example embodiment of the present disclosure.
Figure 8:
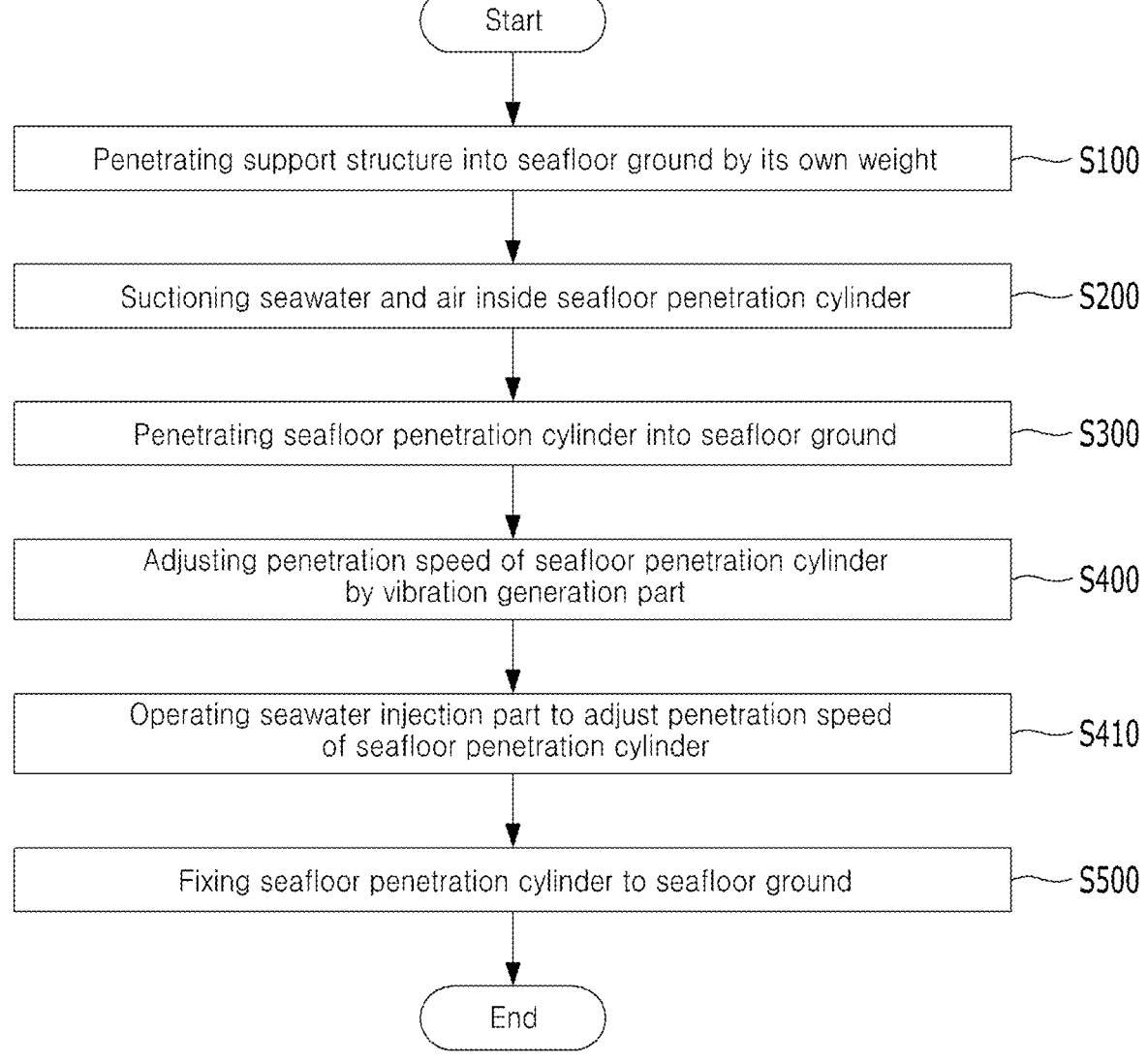
FIG. 8 is a flowchart illustrating a method of installing the support structure for an offshore wind power generator according to an example embodiment of the present disclosure.

FIGS. 1A and 1B are a perspective view schematically illustrating a support structure for an offshore wind power generator according to an example embodiment of the present disclosure. FIG. 2 is a plan view schematically illustrating the support structure for an offshore wind power generator according to an example embodiment of the present disclosure. FIG. 3A to FIG. 3D are diagrams for explaining the number of seafloor penetration cylinders that are provided to constitute the support structure for an offshore wind power generator according to an example embodiment of the present disclosure. FIG. 4 is a graph illustrating a value of $M_R/V_T R$ as a function of the number of seafloor penetration cylinders provided in the support structure for an offshore wind power generator. FIG. 5 is a cross-sectional view schematically illustrating the seafloor penetration cylinder, a drain pump, and a seawater injection part according to an example embodiment of the present disclosure. FIG. 6 is an enlarged view of a rib corresponding to an area A in the perspective view schematically illustrating the support structure for an offshore wind power generator illustrated in FIG. 1A. FIG. 7 is a view schematically illustrating a vibration generation part according to an example embodiment of the present disclosure. FIG. 8 is a flowchart illustrating a method of installing the support structure for an offshore wind power generator according to an example embodiment of the present disclosure.

Hereinafter, the present disclosure will be described in detail with reference to the accompanying drawings.

Referring to FIGS. 1A and 1B, a support structure for an offshore wind power generator 10 according to the present disclosure includes at least one or more seafloor penetration cylinders 100, covers 200 provided on upper ends of seafloor penetration cylinders 100, a supporting stand 300 connected to the covers 200, and a connection part 400 which connects the supporting stand 300 and the covers 200.

The seafloor penetration cylinder 100 has a cylindrical shape in which an interior thereof is empty and has a structure in which an upper end portion is closed and a lower end portion is open. In the following description, the seafloor penetration cylinder 100 of a cylindrical shape is used as an example, but a plurality of seafloor penetration cylinders 100 applied to the support structure for an offshore wind power generator 10 do not necessarily have to be the cylindrical shape. Here, the open lower end portion of the seafloor penetration cylinder 100 penetrates a seafloor ground, and five seafloor penetration cylinders 100 are provided to firmly support the offshore wind power generator. In this case, the number of seafloor penetration cylinders 100 is not limited to five, and may be various number such as three, four, six and the like.

Each of the covers 200 may include at least one of a drain part 500 and a vibration generating part 600 provided therein, and has a hollow structure whose interior is empty. In addition, each cover 200 prevents the drain part 500 and the vibration generation part 600 provided inside the cover 200 from being damaged by seawater, and releases the seawater and air inside the seafloor penetration cylinder 100 to the outside via a drain pipe 520 connected to the drain pump 510.

The supporting stand 300 is connected to the covers 200 by the connection part 400, and is located at the center of the plurality of seafloor penetration cylinders 100. In this case, an additional structure may be coupled and fixed to an upper end portion of the supporting stand 300. Here, the additional structure may be a turbine that plays an important role in the offshore wind power generator. A lot of energy may be obtained from the sea by combining the supporting stand 300 and the turbine in a stable manner.

Further, the connection part 400 connects the covers 200 and the supporting stand 300 and may include a first connection part 410, a second connection part 420, and a third connection part 430.

In this case, the first connection part 410 connects an upper portion of each cover 200 and an intermediate portion of the supporting stand 300 so that the supporting stand 300 may be located at the center of the seafloor penetration cylinders 100. Load of the supporting stand 300 is supported by the five seafloor penetration cylinders 100. Thus, the supporting stand 300 may be fixed in a stable manner.

In addition, the second connecting bar 420 horizontally connects a lower portion of each cover 200 and a lower portion of the supporting stand 300, and connects the five seafloor penetration cylinders 100 and the supporting stand 300. This makes it possible to increase the durability of the support structure for an offshore wind power generator 10 in the seawater and the seafloor ground.

In addition, the third connection part 430 connects five covers 200 to each other. By connecting the five covers 200 to each other, it is possible to horizontally hold the five covers 200 even under force generated from water pressure. Further, even after the support structure for an offshore wind power generator 10 penetrates the seafloor ground, an additional structure provided on the upper end of the supporting stand 300 may be stably supported by connecting the plurality of seafloor penetration cylinders 100.

Referring to FIG. 2, the five seafloor penetration cylinders 100 are arranged in a pentagon shape with the supporting stand 300 as the center. In a circle connecting the centers of the five seafloor penetration cylinders 100, radii from the center of the supporting stand 300 to the centers of the five seafloor penetration cylinders 100 are all the same.

More specifically, the support structure for an offshore wind power generator 10, which includes the five seafloor penetration cylinders 100, may firmly support the additional structure even in a seafloor terrain where the seafloor ground is soft and a base rock depth is shallow.

Figure 3A:
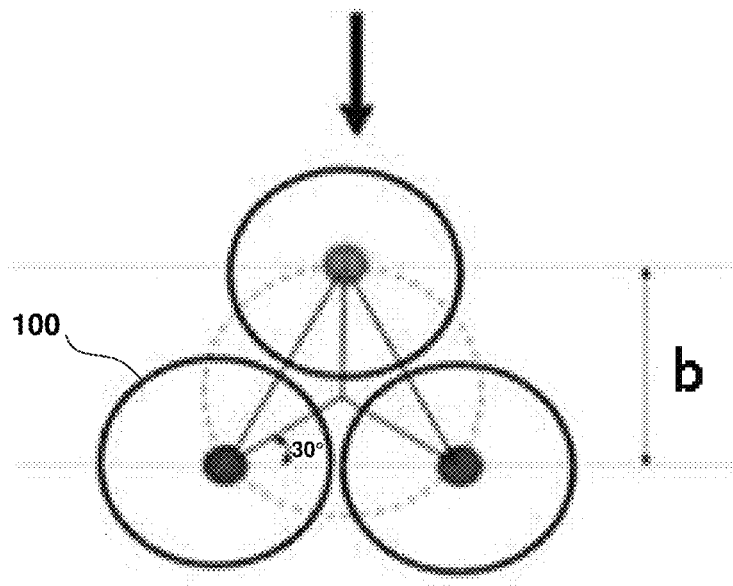
FIG. 3A to FIG. 3D are diagrams for explaining the number of seafloor penetration cylinders that are provided to constitute the support structure for an offshore wind power generator according to an example embodiment of the present disclosure.
Figures 1, 3B:
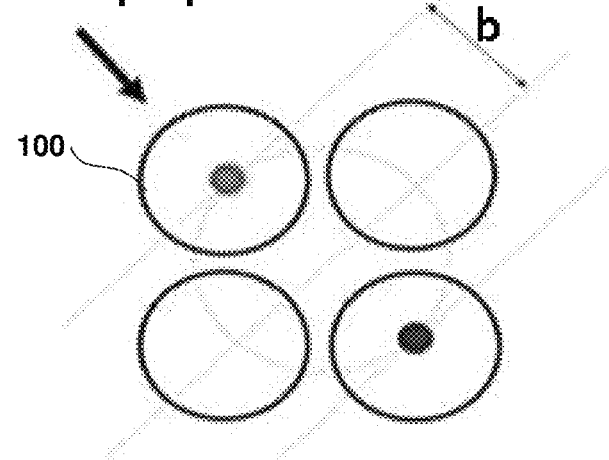
Figures 2, 3B:
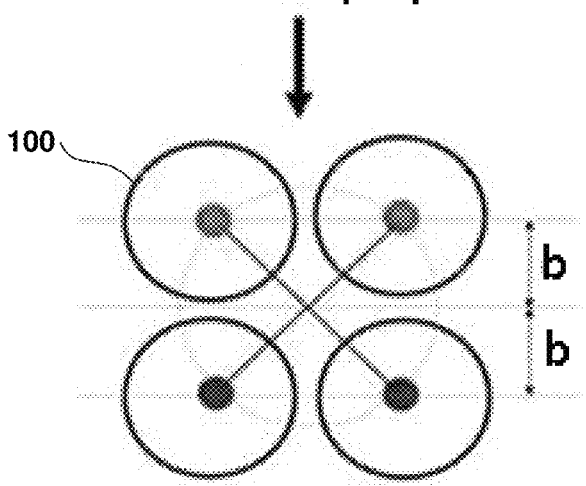
Figure 3C:
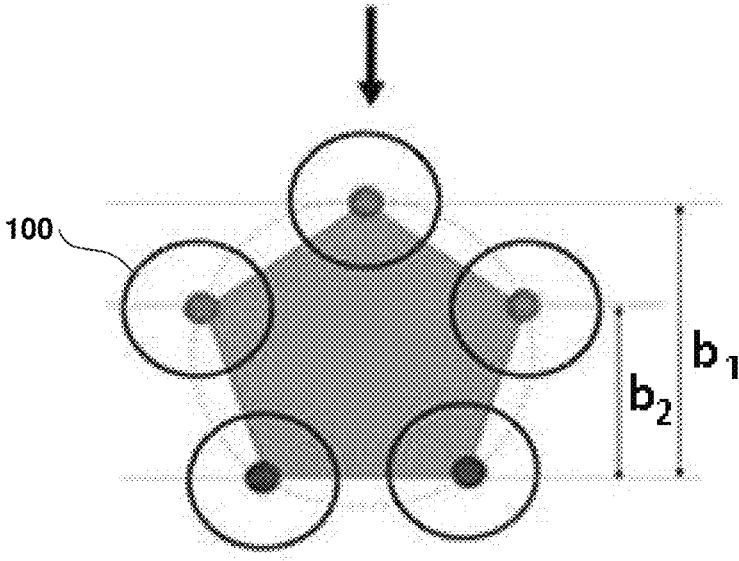
Figure 3D:
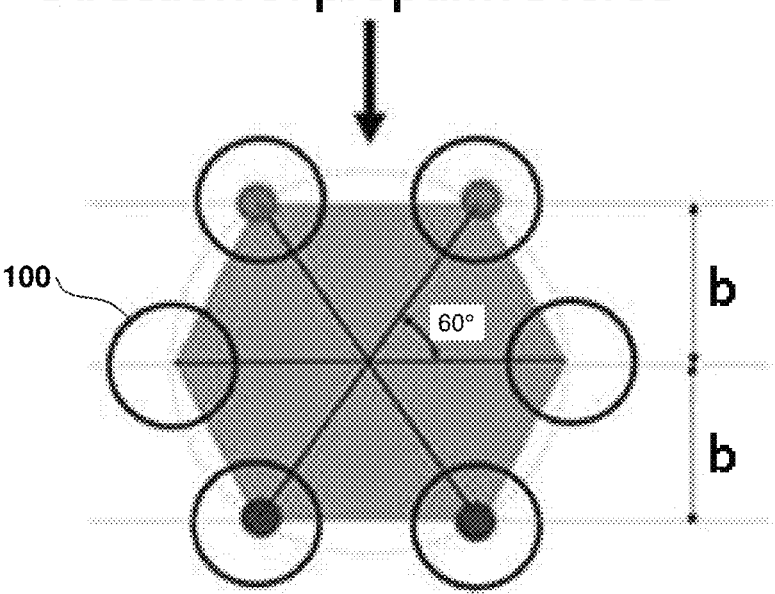

In this regard, referring to FIG. 3A to FIG. 3D, there are schematically illustrated plan views of the seafloor penetration cylinders 100 in which a schematic plan view FIG. 3A illustrates a configuration in which three seafloor penetration cylinders 100 are provided, schematic plan views FIG. 3B-1 and FIG. 3B-2 illustrate configurations in which four seafloor penetration cylinders 100 are provided, a schematic plan view FIG. 3C illustrates a configuration in which five seafloor penetration cylinders 100 are provided, and a schematic plan view FIG. 3D illustrates a configuration in which six seafloor penetration cylinders 100 are provided.

Here, in the schematic plan view FIG. 3B-1, the four seafloor penetration cylinders 100 are arranged in a diamond shape with reference to a direction of propulsive force. In the schematic plan view FIG. 3B-2, the four seafloor penetration cylinders 100 are arranged in a square shape with reference to the direction of propulsive force.

In addition, at the center of each seafloor penetration cylinder 100, a point of resistance generated from an external force (propulsive force) due to wind load is indicated. Resistance to pullout $V_T$ is indicated with a red circle and resistance to compression $V_C$ is indicated with a blue circle.

More specifically, assuming that a distance obtained by vertically connecting the centers of the seafloor penetration cylinders 100 is set to b, and a radius of the circle (dotted-line circle) obtained by connecting the centers of the seafloor penetration cylinders 100 is set to R, a moment of resistance M in the dotted-line circle may be obtained. The moment of resistance in the dotted-line circle may be proportional to a supporting capacity of the support structure for an offshore wind power generator 10 in an area where the base rock depth is shallow.

In the schematic plan view FIG. 3A, three seafloor penetration cylinders 100 are arranged so that when connection lengths obtained by connecting the centers of the three seafloor penetration cylinders 100 to each other form an equilateral triangle. The moment of resistance $M_R$ in the schematic plan view FIG. 3A may be expressed by the equation $M_R=V_T b$. When the distance b between the seafloor penetration cylinders 100 is expressed in terms of R, the distance b becomes 3R/2. In other words, the moment of resistance $M_R$ of the support structure for an offshore wind power generator 10 including the three seafloor penetration cylinders 100 may be expressed by the equation $M_R=3V_T R/2=1.5V_T R$.

In the schematic plan views FIG. 3B-1 and FIG. 3B-2, the four seafloor penetration cylinders 100 are arranged so that connection lengths obtained by connecting the centers of the four seafloor penetration cylinders 100 to each other form a square. When the number of seafloor penetration cylinders 100 is four, the resistance to pullout $V_T$ and resistance to compression $V_C$ are assumed to be identical to each other.

The moment of resistance MR in the schematic plan view FIG. 3B-1 may be expressed by the equation $M_R=V_T b+V_C$ b. Since the distance b between the four seafloor penetration cylinders 100 and the radius R of the dotted-line circle are the same in magnitude, the distance b becomes the radius R. In other words, the moment of resistance $M_R$ of the support structure for an offshore wind power generator 10, which includes the four seafloor penetration cylinders 100 provided in the diamond shape with reference to the direction of propulsive force, may be expressed by the equation $M_R=(V_T+V_C)R=2V_T R$.

The moment of resistance $M_R$ in the schematic plan view FIG. 3B-2 nay be expressed by the equation $M_R=2V_T b+2V_C$ b. When the distance b between the four seafloor penetration cylinders 100 is expressed in terms of R, the distance b becomes Rsin (45)=0.707R. That is, the moment of resistance $M_R$ of the support structure for an offshore wind power generator 10, which includes the four seafloor penetration cylinders 100 provided in the square shape with reference to the direction of propulsive force may be expressed by the equation $M_R=(V_T+V_C) 2b=4V_T b=2.828V_T R$.

In the schematic plan view FIG. 3C, the five seafloor penetration cylinders 100 are arranged so that connection lengths obtained by connecting the centers of the five seafloor penetration cylinders 100 form a regular pentagon. The moment of resistance $M_R$ in the schematic plan view FIG. 3C may be expressed by the equation $M_R=V_T b1+2V_T$ b2. When the distances b1 and b2 between the five seafloor penetration cylinders 100 is expressed in terms of R, the distance b1 becomes R+Rsin (54)=1.588R, b2 becomes Rcos (72)+Rsin (72)=1.118R, respectively. That is, the moment of resistance $M_R$ of the support structure for an offshore wind power generator 10 including the five seafloor penetration cylinders 100 may be expressed by the equation $M_R=1.588V_T R+2.236V_T R=3.824V_T R$.

In the schematic plan view FIG. 3D, the six seafloor penetration cylinders 100 are arranged so that connection lengths obtained by connecting the centers of the six seafloor penetration cylinders 100 form a regular hexagon. The moment of resistance $M_R$ in the schematic plan view FIG. 3D may be expressed by the equation $M_R=2V_T b+2V_C$ b. When the distance b between the six seafloor penetration cylinders 100 is expressed in terms of R, the distance b becomes Rsin (60)=0.866R. That is, the moment of resistance $M_R$ of the support structure for an offshore wind power generator 10 including the six seafloor penetration cylinders 100 may be expressed by the equation $M_R=1.732V_T R+1.732V_C R=3.464V_T R$.

Here, when dividing a value of the moment of resistance $M_R$ by $V_T R$, $M_R/V_T R$ in the schematic plan view FIG. 3A is 1.500, $M_R/V_T R$ in the schematic plan view FIG. 3B-1 is 2.000, and $M_R/V_T R$ in the schematic plan view FIG. 3B-2 is 2.828, $M_R/V_T R$ in the schematic plan view FIG. 3C is 3.824, and $M_R/V_T R$ in the schematic plan view FIG. 3D is 3.464.

FIG. 4 is a graph illustrating the value of $M_R/V_T R$ as a function of the number of seafloor penetration cylinders provided in the support structure for an offshore wind power generator 10.

Referring to FIG. 4, the horizontal axis in the graph represents the number of seafloor penetration cylinders 100 (three to six in FIG. 4), and the vertical axis represents the value of $M_R/V_T R$. Here, the value of $M_R/V_T R$ may be identical to a value of the supporting capacity generated according to the number of installed seafloor penetration cylinders 100. In this case, when the number of seafloor penetration cylinders 100 constituting the support structure for an offshore wind power generator 10 is five, the value of the moment of resistance is highest at 3.824. This means that when the number of seafloor penetration cylinders is five, the supporting capacity of the support structure for an offshore wind power generator 10 is the highest.

That is, in a case of the seafloor ground of the west coast where the seafloor ground is soft and the base rock depth is shallow, a support structure for an offshore wind power generator in the related art is difficult to install because a penetration depth of the seafloor penetration cylinder and a diameter of the seafloor penetration cylinder are limited. However, in the present disclosure, by increasing the installation number of seafloor penetration cylinders 100 up to five, it is possible to install a stationary-type offshore wind power generator even in various seafloor terrains.

Referring to FIG. 5, a drain part 500, a vibration generation part 600, a rib 700, and a seawater injection part 800 are installed in the seafloor penetration cylinder 100. The drain part 500 and the vibration generation part 600 may be located inside the cover 200. Further, the rib 700 may be provided above the seafloor penetration cylinder 100, and the seawater injection part 800 may be located outside the cover 200.

The drain part 500 may include a drain pump 510 and a drain pipe 520 connected to the drain pump 510 to drain seawater. More specifically, the drain pump 510 reduces an internal pressure of the seafloor penetration cylinder 100 by sending out the seawater and air inside the seafloor penetration cylinder 100 outward of the cover 200 through the drain pipe 520. In this case, force generated by a difference between the internal pressure of the seafloor penetration cylinder 100 and an external pressure of the seafloor penetration cylinder 100 may cause the seafloor penetration cylinder 100 to penetrate into the seafloor ground. Further, a penetration depth at which the seafloor penetration cylinder 100 penetrates into the seafloor ground may be adjusted based on the amount of seawater and air suctioned from the drain pump 510.

Referring to FIGS. 5 and 7, when the seafloor penetration cylinder 100 is difficult to penetrate the seafloor ground due to obstacles or rocks, the vibration generation part 600 may assist the seafloor penetration cylinder 100 to penetrate into the seafloor ground by applying vibration and impact downward from the outside of the seafloor penetration cylinder 100. In addition, the vibration generation part 600 may apply vibration and impact to the seafloor penetration cylinder 100 in a direction in which the seafloor penetration cylinder 100 penetrates, to increase the penetration speed and shorten an installation time. Even if horizontal levels of the seafloor penetration cylinders 100 are not arranged, the horizontal levels may be aligned. In this case, the drain pump 510 and the vibration generation part 600 may be controlled simultaneously according to the penetration speed of the seafloor penetration cylinder 100. Alternatively, the drain pump 510 and the vibration generation part 600 may be controlled independently of each other if necessary.

Referring to FIG. 7, the vibration generation part 600 includes a motor 610, an operational member 620 that performs a linear motion, and a hitting part 630.

More specifically, the operational member 620, which is operated by the motor 610, moves linearly in an up-down direction. The hitting part 630 attached to an end of the operational member 620 also moves linearly in the up-down direction. The hitting part 630, which moves linearly in the up-down direction, hits the upper end portion of the seafloor penetration cylinder 100 at a constant speed so that the seafloor penetration cylinder 100 descends with the hit by the hitting part 630. In this case, a reciprocation speed of the hitting part 630 in the up-down direction may be adjusted by adjusting a rotational speed of the motor 610, which makes it possible to adjust the descent speed of the seafloor penetration cylinder 100.

Further, by adjusting the penetration speeds of the seafloor penetration cylinders 100 with the vibration generation part 600, it is possible to adjust the horizontal levels of the seafloor penetration cylinders 100, which makes it possible to increase the supporting capacity of the support structure for an offshore wind power generator 10. In addition, even when the seafloor penetration cylinder 100 is difficult to penetrate into the seafloor ground due to obstacles such as rocks, penetration, the vibration generation part 600 may operate to push out the obstacles so that the seafloor penetration cylinder 100 easily penetrates into the seafloor ground.

In addition, while the vibration generation part 600 has been described to be provided inside the cover 200 and above the seafloor penetration cylinder 100 in the above, but may not be provided inside the cover 200 and above the seafloor penetration cylinder 100.

In addition, the cover 200 is provided above the seafloor penetration cylinder 100 and has a hollow structure with an empty interior. The drain pump 510 and the vibration generation part 600 may be built in the cover 200 so that the drain pump 510 and the vibration generation part 600 are protected from water pressure. Further, damage to the drain pump 510 and the vibration generation part 600 by the seawater may be prevented.

The rib 700 connects the seafloor penetration cylinder 100 and the cover 200. When the support structure for an offshore wind power generator 10 descends to penetrate into the seafloor in the seawater, the rib 700 may increase a bonding strength between the seafloor penetration cylinder 100 and the cover 200 with respect to the water pressure that may occur during the descent.

FIG. 6 is an enlarged view of an area A, which corresponds to the rib 700, in the perspective view schematically illustrating the support structure for an offshore wind power generator 10 illustrated in FIG. 1A.

Referring to FIG. 6, the rib 700 includes a T-shaped support plate 710 fixed to the seafloor penetration cylinder 100 and two reinforcement plates 720 for reinforcing the fixation of the support plate 710 to the seafloor penetration cylinder 100.

More specifically, a plurality of support plates 710 fixed to the upper end portion of the seafloor penetration cylinder 100 have a T-shape and may connect the cover 200 and the seafloor penetration cylinder 100. In addition, the two reinforcement plates 720 are located respectively on the left and right of the support plate 710 so that they are fixed to the seafloor penetration cylinder 100 and the support plate 710. The two reinforcement plates 720 may protect the seafloor penetration cylinder 100 and the cover 200 from the water pressure to enhance the durability of the seafloor penetration cylinder 100 and the cover 200.

That is, the cover 200 and the seafloor penetration cylinder 100 of the support structure for an offshore wind power generator 10 are connected to each other by the ribs 700. This makes it possible to reduce shaking against any force caused by the water pressure and thus improve stability and durability. In this case, the ribs 700 may connect the cover 200 and the seafloor penetration cylinder 100 in a radial fashion with the cover 200 as the center.

The seawater injection part 800 is provided in the seafloor penetration cylinder 100. When the seafloor penetration cylinder 100 penetrates into the seafloor, in a case where the seafloor ground is hard or the penetration speed is slow due to obstacles or the like, the seawater injection part 800 operates a high-pressure pump for seawater 810 to inject high-pressure seawater from an injection nozzle 820. As a result, the seafloor ground becomes soft so that the seafloor penetration cylinder 100 smoothly descends and the descent speed thereof may be increased. At least three or more injection nozzles 820 may be preferably provided fixedly on an inner wall of the seafloor penetration cylinder 100 in the up-down direction. A discharge port of the injection nozzle 820 may be preferably provided toward an end of the seafloor penetration cylinder 100.

Referring to FIGS. 1 and 5, the seawater injection part 800 may include the high-pressure pump for seawater 810 provided in the seafloor penetration cylinder 100, and an injection nozzle 820 connected to the high-pressure pump for seawater 810 via a nozzle pipe 830 to inject seawater flowing into the nozzle pipe 830 according to the operation of the high-pressure pump for seawater 810.

Further, at least three or more nozzle pipes 830 may be connected to the high-pressure pump for seawater 810 via a nozzle connecting pipe 835 installed through a top wall of the seafloor penetration cylinder 100, and the injection nozzle 820 may be connected to each of the at least three or more nozzle pipes 830. In this case, the injection nozzle 820 may be located at a lower portion of the seafloor penetration cylinder 100.

Referring to FIGS. 1A and 1B, a horizontal sensor 900, which is capable of sensing whether or not the horizontal levels of the seafloor penetration cylinders 100 are aligned, may be provided inside the supporting stand 300. In this case, although not illustrated, when the horizontal levels of the seafloor penetration cylinders 100 are not aligned according to results sensed by the horizontal sensor 900, the operations of the vibration generation part 600 and the seawater injection part 800 installed in each seafloor penetration cylinder 100 is controlled under the control of a controller (not illustrated) to align the horizontal levels of the seafloor penetration cylinders 100.

Referring to FIG. 8, in a method of installing the support structure for an offshore wind power generator 10 according to an example embodiment of the present disclosure, the support structure for an offshore wind power generator 10 provided in the deep sea penetrates into the seafloor ground by its own weight (S100). In this case, the number of seafloor penetration cylinders 100, which are one of constituent elements of the support structure for an offshore wind power generator 10, is five. The upper end portion of each seafloor penetration cylinder 100 is closed and the lower end portion thereof is open. The lower end portion partially penetrates into the seafloor ground (S100).

Subsequently, after the lower end portion of the seafloor penetration cylinder 100 partially penetrates into the seafloor ground (S100), the drain pump 510 provided above the seafloor penetration cylinder 100 operates to suction the seawater and air inside the seafloor penetration cylinder 100 (S200). In this case, the seawater and air inside the seafloor penetration cylinder 100, which is suctioned by the operation of the drain pump 510 (S200), are discharged to the outside via the drain pipe 520 connected to the drain pump 510. As the seawater and air inside the seafloor penetration cylinder 100 release to the outside with the suction process by the drain pump 510, the internal pressure of the seafloor penetration cylinder 100 decreases. This causes a difference between the internal pressure of the seafloor penetration cylinder 100 and the external pressure of the seafloor penetration cylinder 100, thus generating a force that presses the seafloor penetration cylinder 100 downward. Therefore, the seafloor penetration cylinder 100 may penetrate into the seafloor ground along with the suction of the interior of the seafloor penetration cylinder 100 by the drain pump 510 (S300).

After Operation S300, the vibration generation part 800 provided at the upper end portion of the seafloor penetration cylinder 100 operates to apply vibration and impact to the seafloor penetration cylinder 100 downward, which makes it possible to assist the descent of the seafloor penetration cylinder 100. For example, when the penetration speed of the support structure for an offshore wind power generator 10 into the seafloor ground is slow, the descent speed of the seafloor penetration cylinder 100 may be increased by increasing the number of vibrations and impacts applied by the vibration generation part 600. In addition, the vibration generation part 600 may adjust the penetration speed of the seafloor penetration cylinder 100 (S400), thereby stably and firmly penetrating and fixing the seafloor penetration cylinder 100 into and to the seafloor ground while aligning the horizontal levels of the seafloor penetration cylinders 100 (S500). In this case, the drain pump 510 and the vibration generation part 600, which suction the seawater and air to penetrate the seafloor penetration cylinder 100 into the seafloor ground, may be controlled in a simultaneous manner. Alternatively, the drain pump 510 and the vibration generation part 600 may be controlled independently of each other according to the penetration speed of the seafloor penetration cylinder 100.

Subsequently, after Operation S300, the seawater injection part 800 provided in the seafloor penetration cylinder 100 operates to inject the high-pressure seawater from the injection nozzle 820 and assist the descent of the seafloor penetration cylinder 100. This operation may be performed separately from or simultaneously with the operation of the vibration generation part 800. For example, in a case where the penetration speed of the support structure for an offshore wind power generator 10 into the seafloor is slow because the seafloor ground into which the seafloor penetration cylinder 100 penetrates is hard or there are obstacles or the like, the high-pressure seawater is injected from the injection nozzle 820 to the hard seafloor ground.

This softens the hard seafloor ground and increases the descent speed of the seafloor penetration cylinder 100. In addition, the seawater injection part 800 may adjust the penetration speed of the seafloor penetration cylinder 100 (S410), thereby stably and firmly penetrating and fixing the seafloor penetration cylinder 100 into and to the seafloor ground while aligning the horizontal levels of the seafloor penetration cylinders 100 (S500). In this case, the drain pump 510 and the seawater injection part 800, which suction the seawater and air to penetrate the seafloor penetration cylinder 100 into the seafloor ground, may be controlled in a simultaneous manner.

Alternatively, the drain pump 510 and the seawater injection part 800 may be controlled independently of each other according to the penetration speed of the seafloor penetration cylinder 100.

In the above detailed description of the present disclosure, specific example embodiments have been described, but the present disclosure should be understood to not be limited to such specific example embodiments and should be understood as including all modifications, equivalents, alternatives falling within the spirit and scope of the present disclosure.

That is, the present disclosure is not limited to the specific example embodiments and the above detailed description, and various modification may be devised by those skilled in the art to which the present disclosure pertains without departing from the gist of the present disclosure. Such modifications fall within the scope of the present disclosure.

EXPLANATION OF REFERENCE NUMERALS

10: Support structure for offshore wind power generator
100: Seafloor penetration cylinder
200: Cover
300: Supporting stand
400: Connection part
410: First connection part
420: Second connection part
430: Third connection part
500: Drain part
510: Drain pump
520: Drain pipe
600: Vibration generation part
610: Motor
620: Operational member
630: Hitting part
700: Rib
710: Support plate
720: Reinforcement plate
800: Seawater injection part
810: High-pressure pump for seawater
820: Injection nozzle
830: Nozzle pipe
900: Horizontal sensor

What is claimed is:

1. A support structure for an offshore wind power generator, the support structure comprising:

a supporting stand configured to support the offshore wind power generator, wherein a lower portion of the supporting stand has a truncated cone shape;

five seafloor penetration cylinders, each seafloor penetration cylinder having a hollow structure in which an upper end portion is closed and a lower end portion is open to form an empty interior, wherein the five seafloor penetration cylinders are arranged at equal intervals on a circumference of a circle surrounding the supporting stand to form a regular pentagon;

covers, respective cover being provided on a corresponding one of the five seafloor penetration cylinders;

drain parts, respective drain part being provided inside a corresponding one of the covers and including a drain pump configured to suction seawater and air inside the corresponding one of the seafloor penetration cylinders, and a drain pipe connecting an interior of the corresponding one of the seafloor penetration cylinders to an exterior of the corresponding one of the covers through the drain pump;

vibration generating parts, respective vibration generation part being provided inside the corresponding one of the covers and configured to apply impact vibration to the corresponding one of the seafloor penetration cylinders to penetrate into a seafloor ground, the respective vibration generation part including a motor configured to move linearly in an up-down direction, an operational member configured to perform a motion in the up-down direction by the motor, and a hitting part provided on a lower end of the operational member;

seawater injection parts, each seawater injection part being configured to inject high-pressure seawater to the seafloor ground, and including:

a high-pressure pump provided on the corresponding one of the seafloor penetration cylinders and configured to generate high-pressure, nozzle pipes installed inside the corresponding one of the seafloor penetration cylinders, a nozzle connecting pipe installed through a top wall of the corresponding one of the seafloor penetration cylinders to connect the nozzle pipes to the high-pressure pump, and injection nozzles fixedly provided on an inner wall of the corresponding one of the seafloor penetration cylinders, respective injection nozzle having a discharge port configured to inject the seawater highly pressured by the high-pressure pump toward the seafloor ground;

a horizontal sensor provided inside the supporting stand and configured to provide horizontal levels of the five seafloor penetration cylinders;

a connection part connecting the respective cover and the supporting stand such that the supporting stand is supported by the covers, wherein the connection part includes:

a first connection part connecting an upper portion of the respective cover and the supporting stand;

a second connection part connecting a lower portion of the respective cover and the lower portion of the supporting stand; and a third connection part connecting the covers to each other, and at least one or more ribs configured to connect the five seafloor penetration cylinders and the covers, wherein each of the at least one or more ribs includes:

a support plate fixed to the respective cylinder and having a T-shape; and a reinforcement plate configured to reinforce the support plate.

2. The support structure for an offshore wind power generator of claim 1, wherein the injection nozzles include at least three or more injection nozzles, and wherein the discharge port of the respective injection nozzle is provided toward an end of the respective seafloor penetration cylinder.

* * * * *